United States Patent
Domschke et al.

(10) Patent No.: US 6,234,092 B1
(45) Date of Patent: May 22, 2001

(54) THERMAL TREATMENT OF INCOMBUSTIBLE LIQUIDS

(75) Inventors: Thomas Domschke, Speyer; Andreas Joa, Neustadt; Klaus Steinebrunner, Plankstadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/456,515

(22) Filed: Dec. 8, 1999

(30) Foreign Application Priority Data

Dec. 16, 1998 (DE) ................................ 198 58 120

(51) Int. Cl.$^7$ ................................................. F23G 7/04
(52) U.S. Cl. ................. 110/238; 431/4; 431/9; 431/10; 431/190
(58) Field of Search ................. 110/238; 431/9, 431/10, 190, 116, 211, 353, 4, 164, 165

(56) References Cited

U.S. PATENT DOCUMENTS

| | | | |
|---|---|---|---|
| 3,718,102 | * | 2/1973 | Hemsath et al. ................... 110/7 R |
| 3,873,671 | * | 3/1975 | Reed et al. ......................... 423/235 |
| 4,785,748 | * | 11/1988 | Sujata et al. ....................... 110/238 |
| 4,915,038 | * | 4/1990 | Sujata et al. ....................... 110/346 |
| 4,957,050 | * | 9/1990 | Ho ...................................... 110/346 |
| 5,129,335 | * | 7/1992 | Lauwers ............................. 110/346 |
| 5,140,916 | * | 8/1992 | Williams ............................ 110/347 |
| 5,154,599 | | 10/1992 | Wunning ............................ 431/215 |
| 5,188,042 | * | 2/1993 | Lauwers ............................. 110/346 |
| 5,451,160 | * | 9/1995 | Becker ................................ 431/284 |
| 5,527,984 | * | 6/1996 | Stultz et al. ........................ 588/205 |
| 5,554,022 | * | 9/1996 | Nabors et al. ..................... 431/10 |
| 5,681,158 | * | 10/1997 | Knapp ................................ 431/5 |
| 5,688,115 | * | 11/1997 | Johnson ............................. 431/9 |
| 5,707,596 | * | 1/1998 | Lewandowski et al. .......... 423/235 |
| 5,762,486 | * | 6/1998 | Leger ................................. 431/8 |
| 5,799,594 | * | 9/1998 | Dernjatin et al. ................. 110/265 |
| 6,119,607 | * | 9/2000 | Guy .................................... 110/346 |

FOREIGN PATENT DOCUMENTS 463218    1/1992   (EP) .

\* cited by examiner

*Primary Examiner*—Denise L. Ferensic
*Assistant Examiner*—K. B. Rinehart
(74) *Attorney, Agent, or Firm*—Keil & Weinkauf

(57) ABSTRACT

A process for the thermal treatment of incombustible liquids in a combustion space of a combustion apparatus by contacting the incombustible liquid with a supplementary fuel in the combustion space in the presence of at least one reactive gas. The process of the invention comprises feeding the incombustible liquid and the supplementary fuel into the combustion space (1) at different points, mixing the incombustible liquid with at least one reactive gas and the supplementary fuel with at least one inert gas prior to the contacting, and vaporizing the incombustible liquid and supplementary fuel prior to the contacting in the combustion space. The advantage of this invention is that environmentally harmful waste waters in particular are disposed of by burning these using a supplementary fuel. The required amounts of supplementary fuel are minimal in the process and only small amounts of nitrogen oxides, carbon monoxide and soot are generated.

16 Claims, 2 Drawing Sheets

THERMAL TREATMENT OF INCOMBUSTIBLE LIQUIDS

Figure 1:
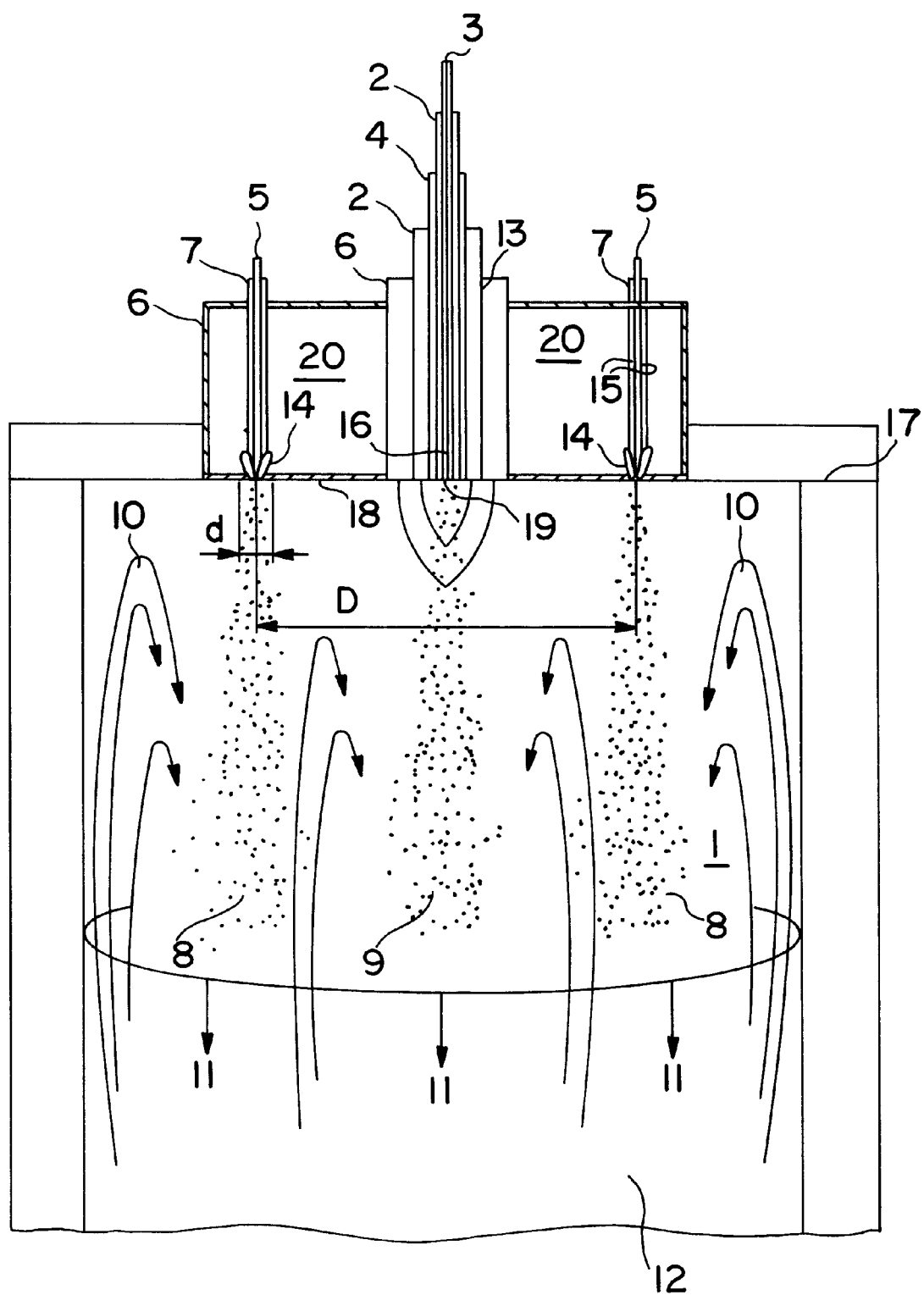

The invention relates to a process and an apparatus for the thermal treatment of incombustible liquids.

For the purposes of the invention, thermal treatment means that combustible constituents of an incombustible liquid (for example a waste water) are chemically converted, while incombustible constituents are generally evaporated.

To treat contaminated waste waters or low heating value liquid wastes, various processes have proved useful in practice. In addition to what are termed generative processes (for example distillation, extraction, adsorption), oxidative waste water treatment processes (for example wet oxidation, ozonolysis, evaporation/combustion) are used especially to treat organically polluted waste waters.

The focus hereinafter will be on the process evaporation/combustion—usually also called "waste water incineration". This process is used when highly polluted waste water streams (contaminant content greater than 50 g/l) are to be disposed of. A waste water incineration plant generally consists of the waste water pretreatment stage (neutralization, concentration), the high-temperature part (combustion apparatus) and the downstream flue gas clean-up devices (quench, electrostatic precipitators). The waste water composition, in particular the type and level of loading, determines the processing design of the individual apparatuses. It must be noted here that even waste water contaminants in the trace region (for example compounds of S, N, P or Cl) can lead to operating problems.

For this reason, particular care must be devoted to the design of the combustion part. However, before the combustion part is considered in more detail, some important terms which are used below are to be defined. The processes which can take place during waste water combustion in the combustion part are especially chemical reactions, for example combustions, gasifications, oxidations or pyrolyses. All of these chemical processes are summarized hereinafter as combustion. In addition to incombustible liquids, liquids which burn poorly or are of low flammability under atmospheric conditions at temperatures of up to about 1000° C., and also nonflammable liquids, are also termed incombustible liquids. Incombustible liquids contain (within the meaning of the waste water combustion principle) combustible components. The word gas is used as a collective term for gases or gas mixtures. For the purposes of the patent, the term mixing also means blending below. Inert gases generally mean those gases which cannot react chemically or only react under extreme conditions (for example temperatures higher than 2000° C. and/or pressures higher than 1000 bar) with a fuel used, However, in an individual case inert gases can also comprise components which can react chemically as such with the fuel used. Vice versa, a fuel can be burned in the presence of a reactive gas. Reactive gases are especially gaseous oxidizing agents, for example oxygen or ozone-containing gases. In contrast, inert gases contain at most an amount of oxidizing agent such that on mixing with the supplementary fuel at combustion space temperature ignition and thus combustion do not occur.

In the combustion of an incombustible liquid, a fuel, what is termed a supplementary fuel, is required. The incombustible part of the incombustible liquid is evaporated and combustible constituents are chemically reacted. Generally, substances which are more environmentally compatible are obtained in the process. It is particularly important to minimise the content of carbon monoxide, soot and nitrogen oxides. In addition, there is the aim of optimizing the ratio of incombustible waste water liquid and supplementary fuel required, i.e., as little fuel as possible is to be used in the combustion. The recovery of the energy supplied for the combustion is generally made problematic, since the components present in the incombustible liquid (chiefly comprising water), for example salts or halogens, would strongly attack the material of heat exchanger apparatuses. A minimum temperature and a corresponding minimum residence time generally ensures sufficient conversion of pollutant. The unwanted formation of nitrogen oxides can be minimized by generating a certain temperature profile and oxygen concentration profile in the combustion space or in the flame. The technical procedure of the combustion is critical for the environmental compatibility and economic efficiency of the combustion. It has been found here, for example, that the atomization of a mixture of supplementary fuel and incombustible liquid (for example using a nozzle) is advantageous prior to the combustion. Correct design of the nozzle/burner/combustion chamber system, ie. matching atomization and combustion, is of particular importance here if waste waters having a high loading of organically bound carbon are also to be worked up by combustion. Care must be taken especially to ensure that the combustion temperature is neither too high nor too low. At too high a temperature the formation of nitrogen oxides is promoted, while at too low a temperature incomplete combustion, soot formation and carbon monoxide formation occur. In addition, care must be taken to ensure that the combustion takes place in the presence of sufficient quantities of reactive gas in order to counteract especially the formation of carbon monoxide and soot. In industry, for waste water incineration (incineration of incombustible liquids), what are termed combination burners are used which use heating oil, natural gas or high-energy wastes as supplementary fuel. These burners are constructed in such a manner that a stabilized flame is generated by the supplementary fuel and an incombustible-liquid spray produced (produced by atomization in a gas) is mixed with this flame or with the complete-combustion region of the flame.

There is particular interest in industry in also using liquid supplementary fuels. However, the disadvantage is that, when many burners used in the industry are employed, there is severe soot formation, since the hot supplementary fuel flame is quenched by the incombustible liquid.

EP-B-0 463 218 describes a process and an apparatus in which the formation of a stabilized flame is avoided. In this process, the fuel is fed at high velocity (high axial momentum) into a combustion space separately from the combustion air, so that the combustion air is mixed with relatively large amounts of exhaustively burnt flue gas prior to fuel contact. Liquid fuels can also be reacted in this case by "flameless oxidation". However, if a waste water combustion is also to be carried out by this process, incombustible liquid and liquid supplementary fuel must be miscible with one another (which is not usually the case, however) or supplementary fuel and incombustible liquids must be separately atomized in the center of the burner prior to being fed into the burner. There is the disadvantage here that waste water droplets and supplementary fuel droplets, prior to complete vaporization, penetrate into injected combustion air jets and thus water droplets (or other droplets consisting of incombustible liquids) impact on ignited supplementary fuel droplets, soot formation thus occurring.

It is an object of the present invention to provide a more economical and more environmentally compatible process for the combustion of incombustible liquids. In this process, the amount of supplementary fuel required is to be minimized and especially liquid supplementary fuels having high contents of high-boilers (for example fuel oil) shall also be usable. In the combustion it is of importance that minimum pollutant loads of carbon monoxide, nitrogen oxides and soot are formed. In addition, as complete a conversion as possible of the combustible contents in the incombustible liquid is to be achieved.

We have found that this object is achieved by the process for the thermal treatment of incombustible liquids in a combustion space of a combustion apparatus by contacting the incombustible liquid with a supplementary fuel in the combustion space in the presence of at least one reactive gas.

The process according to the invention comprises feeding the incombustible liquid and the supplementary fuel into the combustion space at different points, mixing the incombustible liquid with at least one reactive gas and the supplementary fuel with at least one inert gas prior to the contacting, and vaporizing incombustible liquid and supplementary fuel prior to the contacting in the combustion space.

In a preferred embodiment, supplementary fuel and incombustible liquid are fed atomized into the combustion space.

According to the invention, an apparatus for carrying out the above process is also provided, with the following apparatuses being present:

a) a combustion space,
b) a feed line for gaseous supplementary fuel and/or a feed line for liquid supplementary fuel,
c) a feed line for the incombustible liquid,
d) a feed line for reactive gas,
e) a feed line for inert gas,
f) a nozzle for feeding the mixture of supplementary fuel and inert gas into the combustion space and
g) a plurality of nozzles for feeding the mixture of incombustible liquid and reactive gas into the combustion space.

In a preferred embodiment, an atomizer for liquid supplementary fuel and/or an atomizer for the incombustible liquid is disposed outside the combustion space.

The nozzle for feeding the mixture of supplementary fuel and inert gas and/or the nozzles for feeding the mixture of incombustible liquid and reactive gas can also be non-tapered tube ends. However, this is generally only the case when the combustion apparatus has the above-described atomizers for liquid supplementary fuel and for the incombustible liquid. Liquid/gas spray is generated in this case by the atomizers and is then fed into the combustion space via the nozzles.

The mixing of the incombustible liquid with reactive gas and/or that of the supplementary fuel with inert gas takes place either before the feed outside the combustion space (generally via the atomizers) or during the feed into the combustion space, preferably in the region of the nozzles provided for the feed (liquid/gas spray is generated in this case via the use of the nozzles). The supplementary fuel used can either be a gas or a liquid. However, the use of a liquid is preferred. If the supplementary fuel used is a liquid, this is generally mixed with inert gas (for example nitrogen or steam) by atomization in the latter and then the mixture produced is sprayed at high axial velocity (generally at least 20 m/s) into the combustion space via one or more nozzles. Axial velocity in this context is the momentum-averaged axial exit velocity of the gas/liquid mixture (axial in this context relates to the material exiting rectilinearly from the nozzle, The momentum-averaged axial velocity (momentum-averaged axial exit velocity) w' of a gas-liquid spray can then be calculated using the formula below (m=mass flow rate, w=exit velocity, mw=momentum flux, Z=atomizer gas, G=gas (a gas introduced separately from the atomizer gas), S=sound, A=incombustible liquid):

$$w' = \frac{\dot{m}_A w_A + \dot{m}_Z w_S + \dot{m}_L w_L}{\dot{m}_A + \dot{m}_Z + \dot{m}_L}$$

The incombustible liquid and reactive gas are also mixed with one another preferably by atomizing the incombustible liquid in the reactive gas, and the mixture generated is sprayed into the combustion space at high axial velocity via one or more nozzles. The momentum-averaged axial velocity at which the mixture generated is sprayed into the combustion space is generally from 20 to 120 m/s, preferably from 50 to 100 m/s, on exit from the nozzles.

Typically, the ceiling (surface on the top) of the combustion space is a (usually planar) surface which has orifices, the latter corresponding to the exits of the nozzles present in the combustion apparatus. In a preferred embodiment, a plurality of nozzles for feeding the mixture of incombustible liquid and reactive. gas are disposed in such a manner that these surround (preferably symmetrically) the nozzle for feeding the mixture of supplementary fuel and inert gas. The nozzles for feeding the mixture of incombustible liquid and reactive gas are generally disposed in a circle here in the center of which is situated the nozzle for feeding the mixture of supplementary fuel and inert gas. This circle then preferably has a diameter which i from 3 to 20 times, preferably from 5 to 10 times, as big as, by comparison, the inner diameter or the equivalent diameter of the nozzles for feeding the mixture of incombustible liquid and reactive gas. The nozzles for feeding the mixture of incombustible liquid and reactive gas are usually disposed at the same distance from one another. The design according to the invention of the combustion apparatus ensures that the incombustible liquid vaporizes rapidly in the combustion space, by "sucking back" hot, completely burned flue gases, without coming into contact with fuel droplets. The fuel spray generated is likewise vaporized by hot "sucked back" flue gas (gas formed in the combustion). The total mixture of reactive gas, vaporized incombustible liquid and vaporized supplementary fuel usually burns flamelessly. Flameless combustion generally means combustion at locally lower tempertures, so that the unwanted nitrogen oxide formation is substantially suppressed. In addition, there is no quenching of ignited fuel droplets, so that no soot forms in the process of the invention. The amount of supplementary fuel required is comparatively low here (appropriate data are listed in the examples), since stable reaction occurs even at markedly lower specific fuel use.

The incombustible liquid typically arises as processed waste to be disposed of, as residue or as waste waters. These are, for example, low heating value liquid process residues or wastes which are highly polluted especially with organic residues. Before the combustion, the corresponding liquids, which generally frequently comprise water or other incombustible liquids, are concentrated, for example by evaporation. Expediently, the incombustible liquid comprises one or more components which are chemically converted during the thermal treatment (principle of waste water incineration). In addition to incombustible liquids, incombustible dispersions which consist of liquid phases can also be thermally treated. Thermal treatment thus means that combustible constituents of an incombustible liquid are chemically converted (burned), while incombustible constituents are generally vaporized. The incombustible liquid and the supplementary fuel are generally completely vaporized, the vaporization being due especially to heating by "flue gas intake".

The combustion products of organic residues which are formed in this case are usually for the most part carbon dioxide and water, which may be discharged into the environment.

The inert gas used is generally a gas with which a supplementary fuel, if this is present in a mixture consisting of the inert gas and the supplementary fuel, cannot be burned. Thus for each fuel the inert gas must be defined individually, since in relation to some fuels a gas may be inert, but not in relation to other fuels (the ignition properties differ depending on the fuel). Usually nitrogen and/or steam and/or exhaust gas is a suitable inert gas. However, in some cases, air, for example, can also be used as an inert gas (air is then not able to ignite the fuels used in these cases).

The reactive gas used can be in particular air or another oxygen-containing gas which has from 10 to 100% by volume, preferably from 20 to 100% by volume, of oxygen. In principle all reactive gases are suitable which can be reacted chemically with components of the incombustible liquid. In particular, oxidizing gases such as oxygen or ozone are suitable.

As already mentioned at the outset, the combustion temperature is critical in waste water incineration. The combustion space of the combustion apparatus of the invention is usually thermally insulated. In the combustion space, temperatures from 500 to 2000° C., preferably from 800 to 1200° C., are generally present. At these temperatures usually substantially complete combustion of the residues present in the incombustible liquid takes place and simultaneously soot formation and carbon monoxide/nitrogen oxide formation is counteracted.

The drawing shows an example of the invention. FIG. 1 shows a typical embodiment of the combustion apparatus according to the invention (the basic principle of the process of the invention can be illustrated by this). This comprises, inter alia, a combustion space 1, nozzles 14 for feeding the mixture of incombustible liquid and reactive gas, atomizers 15 for the incombustible liquid, atomizers 16 for liquid supplementary fuel and a lighting-up burner 13. The combustion space 1 is thermally insulated (adiabatically or partially adiabatically) and is additionally heated to a temperature of approximately 900° C. by the lighting-up burner 13 (for example a commercially conventional natural gas burner). Thereafter, the air feed is switched over to the nozzles 14 for feeding the mixture of incombustible liquid and reactive gas (these are generally high velocity air nozzles). In the flameless operating state, the fuel natural gas can be replaced by another fuel gas, a liquid fuel or by high-energy liquid waste (combustion enthalpy greater than 20 kJ/g). The liquid fuel (supplementary fuel) is finely atomized in this case by an atomization gas (for example air, if the flammability limit is not reached by the use of air—the use of nitrogen or steam is also possible here). For this purpose, an atomizer 16 is used for liquid supplementary fuel, preferably designed as an externally atomizing two-component atomizer. With liquid fuels of elevated viscosity and/or elevated high-boiler content, the fuel is preheated and preferably atomized with steam or preheated nitrogen. The incombustible liquid is atomized by one or more atomizers 15 for the incombustible liquid, frequently likewise designed as externally atomizing two-component atomizers, which are situated in the center of the nozzles 14 for feeding the mixture of incombustible liquid and reactive gas. The nozzles 14 and the atomizers 15 are dimensioned such that the generated mixture of incombustible liquid and reactive gas exits at a momentum-averaged axial velocity of at least 20 m/s and at most 150 m/s, preferably from 50 to 100 m/s.

Figure 2:
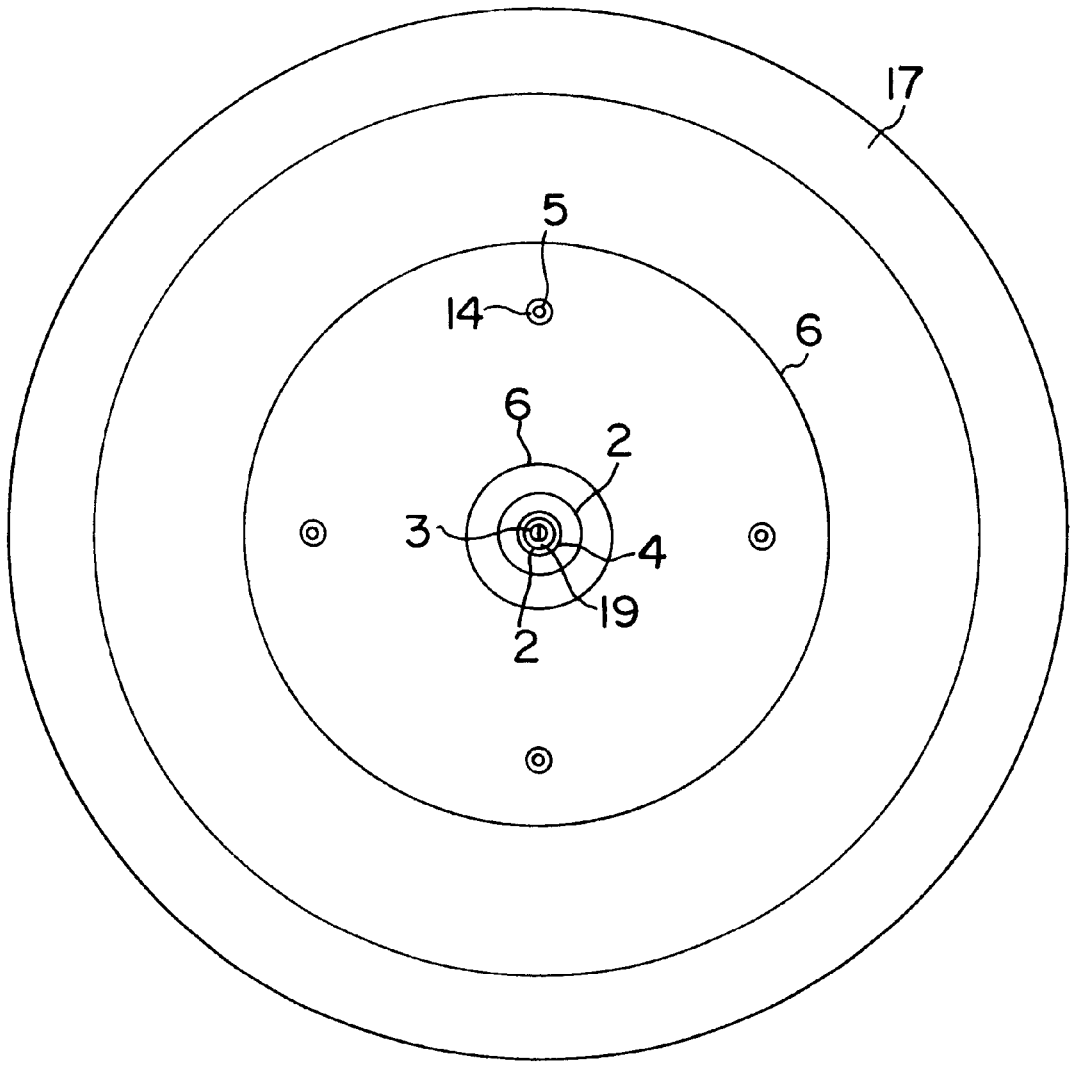

FIG. 2 is a cross-section showing the circular face of the burner and nozzles.

In the case of burners of relatively low power, the combustion air (reacted gas) can be used directly as atomization gas by supplying the air box 20 with a pressure greater than 2 bar. The combustion air then exits at the speed of sound and is mixed with the incombustible liquid via the atomizer 15 before it is fed into the combustion space 1. The nozzles 14 for feeding this mixture of incombustible liquid and reactive gas into the combustion space 1 are in this case simple (non-tapered) tube ends.

In the case of burners of relatively high power, the use of compressed air as combustion air supply would be uneconomical. In such a case, the atomizer 15 is designed as a two-component atomizer, and the atomization air (reactive gas) is provided as compressed air via the feed line 7. The content of compressed air in the mass flow of the mixture fed is approximately 10–15%. The remaining air requirement (reactive gas requirement) is provided by a fan via the feed line 6. The mixture of incombustible liquid/reactive gas causes an intensive circulation of hot flue gases 10 from the complete-combustion region 11. The droplets in the mixture of incombustible liquid/reactive gas are vaporized by the penetration of the hot flue gases 10. The droplets of the liquid supplementary fuel in the mixture are likewise substantially prevaporized or gasefied before the air contact. In the complete-combustion region 11, an oxygen concentration prevails which is so low that no ignited combustion can occur. The temperatures nowhere exceed the adiabatic flame temperature of the overall mixture of 900–1000° C. This greatly decreases both the soot formation and also the thermal formation of nitrogen oxide.

The drawing, as described above, shows a preferred embodiment of the combustion apparatus of the invention.

It is a burner which is designed for a thermal output of approximately 50 kW. This comprises an ionization-monitored electrically ignitable gas burner (lighting-up burner 13), into the center of which a liquid atomizer is built in (generally designated as atomizer 16 for liquid supplementary fuel). This liquid atomizer can atomize two liquid streams via a gaseous auxiliary medium. A spray cone having an aperture angle of approximately 19° forms. An annular air box 20 is installed around the outer tube of the gas bonier. On the end face of the air box are situated four high velocity nozzles (nozzles 14 for feeding the mixture of incombustible liquid and reactive gas), from which the combustion air (reactive gas), which is fed via feed line 7, exits at the speed of sound. Into each of the gas channels was installed centrally a thin liquid tube (feed line 5 for the incombustible liquid), through which a waste water or another low heating value liquid waste can be fed. This feed line 5 for the incombustible liquid ends just before the gas outlet borehole. The water is taken up and atomized by the air flow. A spray cone having an aperture angle of approximately 19° also forms in this case. The burner is installed in a brick-lined combustion space 1 (inner diameter 25 cm, length 3 m). The thermal losses of the combustion space 1 are about 5 kW at a mean internal temperature of approximately 1000° C., for example. If, via the feed line 3 for liquid supplementary fuel, a sufficient stream of high-caloric waste or liquid fuel is fed, the lighting-up burner 13 can be switched off. To monitor the burner function then, instead of the ionization monitoring, the combustion space temperature is monitored via the thermocouple 12.

The invention is described in more detail below with reference to examples.

EXAMPLE 1

The combustion space 1 was first heated to a temperature above 850° C. by the lighting-up burner 13. The combustion air feed was then diverted from the lighting-up burner 13 to the high velocity air nozzles (nozzles 14 for feeding the mixture of incombustible liquid and reactive gas). Via four waste water atomizers 15, a total of 5l of water per hour was then fed. The natural gas stream used (natural gas was used as gaseous supplementary fuel) was decreased to a few m³/h (S.T.P.), the airstream was set so that a residual oxygen content of 3% was measured in the dry flue gas. In the combustion space 1, a wall temperature profile between 750° C. and 850° C. was established. The degree of combustion was virtually complete (2 ppm CO in the dry flue gas). The nitrogen oxide concentration in the dry flue gas was from 7 to 8 ppm. The carbon monoxide and nitrogen content were determined by infrared and UV absorption spectrometry. The specific fuel use was 0.2 m³ (S.T.P.)/kg, that is only 0.01 m³ (S.T.P.)/kg more than the minimum theoretical caloric value for reaching the combustion space temperature.

If the burner is operated as a conventional flame vaporization burner, that is natural gas and air are added via a burner and the waste water is added via a central atomizer, a natural gas rate of 0.27 m³ (S.T.P.)/kg is necessary for stable operation. The nitrogen oxide emissions increase to 40 ppm (determination by infrared and UV absorption spectrometry).

EXAMPLE 2

From the operating state of Example 1, the natural gas stream was successively decreased and simultaneously fuel oil was added via the central atomizer (an atomizer 16 for liquid supplementary fuel). A stable operating state resulted at 1l of fuel oil per hour at 2 m³(S.T.P.)/h $N_2$ as atomizing gas (no natural gas). The degree of combustion was likewise complete. The nitrogen oxide emissions were 15 ppm.

List of designations:
 1 Combustion space
 2 Feed line for gaseous supplementary fuel
 3 Feed line for liquid supplementary fuel
 4 Feed line for inert gas
 5 Feed line for the incombustible liquid
 6 Feed line for reactive gas
 7 Feed line for reactive gas
 8 Spray comprising incombustible liquid and reactive gas
 9 Spray comprising supplementary fuel and inert gas
 10 Hot flue gases
 11 Complete-combustion region
 12 Thermocouple
 13 Lighting-up burner
 14 Nozzle for feeding the mixture of incombustible liquid and reacted gas
 15 Atomizer for the incombustible liquid
 16 Atomizers for the liquid supplementary fuel
 17 Lining for the thermal insulation of the combustion space
 18 Ceiling of the combustion space
 19 Nozzles for feeding the mixture of supplementary fuel and inert gas
 20 Air box

We claim:

1. A process for the thermal treatment of combustible liquids in a combustion space (1) of a combustion apparatus by contacting the incombustible liquid with a supplementary fuel in the combustion space (1) in the presence of at least one reactive gas, which comprises feeding the incombustible liquid and the supplementary fuel into the combustion space (1) at different points, mixing the incombustible liquid with at least one reactive gas and the supplementary fuel with at least one inert gas prior to the contacting, and vaporizing incombustible liquid and supplementary fuel prior to the contacting in the combustion space, said inert gas containing, at most, an amount of oxidizing agent, in which ignition and combustion do not occur when mixing said inert gas with the supplementary fuel at combustion space temperatures.

2. A process of claim 1, wherein the mixing of the incombustible liquid with reactive gas and/or that of the supplementary fuel with inert gas is carried out during the feed into the combustion space(1).

3. A process of claim 1, wherein the supplementary fuel used is a liquid.

4. A process of claim 1, wherein the supplementary fuel used is a liquid which is mixed with inert gas by atomization in the inert gas and wherein the mixture generated is sprayed into the combustion space(1) at high axial velocity by one or more nozzles (19).

5. A process of claim 1, wherein the incombustible liquid and reactive gas are mixed with one another by atomization of the incombustible liquid in the reactive gas, and wherein the mixture generated is sprayed into the combustion space (1) at high axial velocity via one or more nozzles(14).

6. A process of claim 5, wherein the momentum-averaged axial velocity at which the mixture generated is sprayed into the combustion space (1) is from 20 to 150 m/s on exit from the nozzles.

7. A process of claim 1, wherein the incombustible liquid arises as process waste to be disposed of, as residue or as waste waters.

8. A process of claim 1, wherein the incombustible liquid comprises one or more components which are chemically converted during the thermal treatment.

9. A process of claim 1, wherein the inert gas used is gas with which supplementary fuel, if this is present in a mixture consisting of the inert gas and the supplementary fuel, cannot be burned.

10. A process of claim 1, wherein the inert gas is nitrogen and/or steam and/or exhaust gas.

11. A process of claim 1, wherein the reactive gas used is air or another oxygen containing gas which has from 10 to 100% by volume, of oxygen.

12. A process of claim 1, wherein a temperature of form 500 to 2000° C. is present in the combustion space (1).

13. The process of claim 2, wherein mixing is carried out in the region of nozzles (14,19) provided for the feeding.

14. The process of claim 6, wherein the velocity is from 50 to 100 mls.

15. The process of claim 11, wherein the other oxygen-containing gas has from 20 to 100% by volume of oxygen.

16. The process of claim 12, wherein the temperature is from 800 to 1200° C.

* * * * *